Oct. 18, 1966     F. B. LUTZ ETAL     3,279,238
AERODYNAMIC FABRIC APPEARANCE TESTER
Filed Sept. 6, 1963
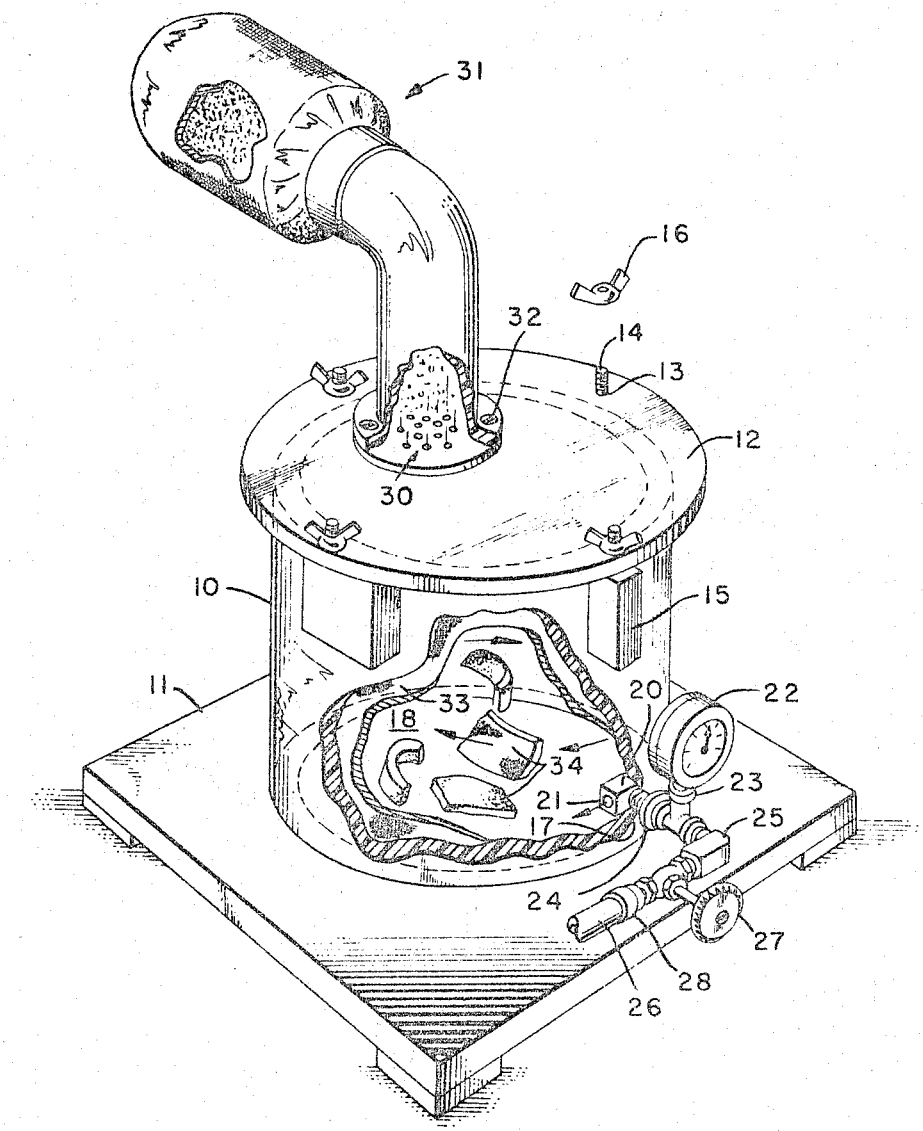
INVENTORS
F. B. LUTZ
W. A. BURTON
P. H. MARTIN
BY Robert L. Broad Jr.
ATTORNEY 3,279,238
AERODYNAMIC FABRIC APPEARANCE TESTER
Frank B. Lutz, Athens, and William A. Burton and Prentis H. Martin, Decatur, Ala., assignors to Monsanto Company, a corporation of Delaware
Filed Sept. 6, 1963, Ser. No. 307,215
4 Claims. (Cl. 73—7)

This invention relates to an apparatus for testing the pilling and shedding propensity of fabrics and more particularly to a device for measuring in a single operation the amount of pilling and shedding to be expected from a blanket during actual wear.

In the manufacture of fabrics it is common and usually essential that samples of the fabric be tested in order to ascertain the degree of pilling and shedding to be expected from actual use of the manufactured article. To be able to make such a prediction with a desirable degree of accuracy the fabric to be tested must be subjected to an environment similar to that which the manufactured article will be exposed in actual use.

In the conventional practice simulated conditions for predicting pilling have been produced by devices comprising a chamber with an agitator or beater disposed therein and a removable closure member on one end of the chamber for introducing samples into the chamber. This device is not very satisfactory because the rigid agitator blades tend to beat the fabric severely. Therefore the simulated conditions are not representative of the conditions which the manufactured article will experience in actual use.

Similarly, in the conventional practice simulated conditions for testing the propensity of fabric to "shed" have been obtained under combing conditions which are not representative of actual use. Moreover, in the conventional practice, the pilling and shedding tests are performed separately in different machines. Accordingly, an object of this invention is to provide a device which will accomplish in a single test what has been done previously by two devices.

Another object of the present invention is to provide a device for measuring accurately the propensity of fabrics to pill and shed.

A further object of the present invention is to provide a device having a chamber for testing fabrics under simulated conditions which are representative of actual wear conditions by rotating test specimens of the fabric about the chamber with a pressurized fluid.

One embodiment of the present invention contemplates an aerodynamic blanket appearance tester comprising a chamber made of Plexiglass or a similar light weight material. The chamber is lined with a suitable diaphragm, preferably cotton sheeting, and is provided with an inlet connection at one end and a plurality of outlet ports at the other end. A pressure gauge and control valve are mounted at the inlet of the chamber to provide means for regulating the pressure therein and a filter is mounted at the outlet of said chamber to collect lost fiber caused by the abrasive action which occurs between the test specimens and diaphragm when a fluid under pressure is passed through the chamber.

Other objects and advantages of the invention will become apparent from the following detailed description and a single drawing which shows part of the chamber wall broken away to better illustrate the device.

Referring in detail to the drawing, a cylindrical tubular member 10 is mounted on a base plate 11 by gluing or any other other suitable method. An apertured circular closure member 12 having a diameter greater than the tubular member 10 is connectable to the other end of said tubular member 10 to form a chamber 18. The closure member is provided with a plurality of holes 13 spaced near the periphery thereof to cooperate with a similar number of screw threaded studs 14 which are mounted in a like number of support blocks 15. The support blocks are fixed to the outside diameter of the cylindrical chamber. Winged nuts 16 are used to secure the closure member tightly against the upper edge of the cylindrical chamber to form a seal therebetween.

The chamber 18 is provided with an aperture near the base plate and a fitting 20 disposed in the aperture having an inlet port 21 extending into the chamber. A pressure gauge 22 is mounted on a T 23 which is connected to the fitting 20 on one side by a union 24 and to an L-shaped fitting 25 on the other side. A hose 26 having a control valve 27 mounted therein is connected to fitting 25 by U-clamp 28. A fluid under pressure, preferably air, is introduced into the chamber through hose 26 from a source not shown. It is desirable to regulate the introduced fluid pressure for the reason that the intensity of abrading is determined by the fluid pressure.

The removable closure member 12 is provided with a group of escape ports 30 which are spaced slightly off-center in order to produce a desired turbulence of the fluid passing through the chamber. A filter 31 for collecting particles escaping from the chamber is attached to the closure member by screws 32 on the side opposite the chamber. The inside wall of the cylindrical chamber is lined with a diaphragm 33 which is made from a material having an abrasive like surface, preferably cotton sheeting.

In operation of the device, a batch of samples or test specimens 34 are placed in the test chamber 18 by removing closure member 12. A fluid under pressure is then passed through the chamber. An inlet fitting 20 is arranged so that the inlet port 21 is substantially parallel to the base plate 11 and at a right angle with the opening 17 through the chamber wall. Such an arrangement of the inlet port directs the incoming fluid against the cylindrical chamber wall to produce a spiral shaped path through the chamber before escaping out ports 30. The samples or test specimens are lifted from the floor 10 of the chamber by the pressurized fluid and, at a certain point from the bottom of the chamber, drop back to their initial position because of their weight to repeat the cycle again. From the above described arrangement it is apparent that the samples or test specimens are abraded uniformly against the diaphragm 33, and each other, to cause pilling and shedding. The shedded or lost fiber is collected by filter 31 and weighed to determine the percent fiber lost or "shedded." To determine the pilling propensity of the fabric the test specimens are graded under horizontal lighting. Accordingly, a test may be performed by the described invention whereby it can be predetermined accurately what the appearance of a blanket or other other item will be like after being put in actual use.

It is to be understood that the embodiment disclosed herein may be modified or amended and that numerous other embodiments may be contemplated without departing from the spirit and scope of the invention.

What is claimed:
1. An apparatus for testing the wear resistance properties of fabrics comprising:
   (a) a cylindrical chamber having cylindrical walls lined with an abrasive material,
   (b) means positioned near one end of said chamber for directing a fluid circumferentially around the cylindrical walls of the said chamber,
   (c) an outlet at the other end of the cylindrical chamber for discharging the fluid, said outlet being pro- vided with a filter for entrapping loose particles of fiber,
(d) removable means for introducing and removing test samples of fabric into and from said chamber, and
(e) means for controlling the fluid being introduced into said chamber.

2. An apparatus for measuring the pilling and shedding propensity of fabrics comprising:
(a) A base,
(b) a tubular member having one end fixed to the base and a removable apertured closure means connected to the other end of the tubular member to form a chamber, said tubular member having an aperture in a wall of the chamber near the base,
(c) a fitting having a passageway therethrough disposed in the aperture to form an inlet into the chamber, said passageway being positioned to direct a fluid circumferentially around the wall of the chamber, said chamber wall being lined with an abrasive material,
(d) a plurality of outlet ports having a filter associated therewith for entrapping loose particles,
(e) an air hose connected to the said inlet fitting for introducing fluid under pressure into the said chamber, and
(f) means associated with the said air hose for regulating the fluid being introduced into the said chamber.

3. An apparatus for measuring the pilling and shedding propensity of fabrics comprising:
(a) a base plate,
(b) a cylindrical tubular member fixed to the base plate member at one end,
(c) an apertured closure member removably connected to the other end of the tubular member to form a chamber, said chamber being lined with a diaphragm, having an abrasive surface,
(d) means providing an aperture through a wall of the said tubular member near the base plate and an L-shaped hollow fitting disposed therein being arranged to direct a pressurized fluid circumferentially around the said wall of the said chamber,
(e) a plurality of escape ports through the closure member spaced slightly off-center and a filter associated with the said escape ports for entrapping loose fiber,
(f) an air hose connected to the inlet fitting for introducing a pressurized fluid into the test chamber, and
(g) a control valve and pressure gauge associated with the said air hose for regulating fluid flow through the said test chamber.

4. The method of testing a fabric for pilling and shedding, comprising:
(a) positioning fabric samples in an enclosed space having an abrading surface,
(b) passing a stream of air through the said space in such a manner that the samples are swirled around the said enclosed space in engagement with the said abrading surface which removes loose fibers from the surface areas of said samples,
(c) collecting the removed loose fibers and weighing them to determine the amount of shedded fiber, and
(d) determining the pilling propensity thereof by light inspection means.

References Cited by the Examiner
UNITED STATES PATENTS

| | | | |
|---|---|---|---|
| 2,187,514 | 1/1940 | Gardner | 73—61 |
| 2,862,383 | 12/1958 | Stiegler | 73—7 |
| 2,911,730 | 11/1959 | Schaub et al. | 34—10 X |
| 3,184,952 | 5/1965 | Humphreys | 73—7 X |

DAVID SCHONBERG, *Primary Examiner.*